(12) United States Patent
Nakaho et al.

(10) Patent No.: US 7,643,201 B2
(45) Date of Patent: Jan. 5, 2010

(54) ELECTROCHROMIC MIRROR

(75) Inventors: Junichi Nakaho, Aichi-ken (JP);
Masaharu Hattori, Aichi-ken (JP);
Atsushi Yamaguchi, Aichi-ken (JP);
Nagahiro Saito, Aichi-ken (JP);
Takahiro Ishizaki, Aichi-ken (JP);
Osamu Takai, Aichi-ken (JP)

(73) Assignees: Kabushiki Kaisha Tokai-Rika-Denki-Seisakusho, Aichi-ken (JP); National University Corporation Nagoya University, Aichi-ken (JP)

( * ) Notice: Subject to any disclaimer, the term of this patent is extended or adjusted under 35 U.S.C. 154(b) by 10 days.

(21) Appl. No.: 12/144,151

(22) Filed: Jun. 23, 2008

(65) Prior Publication Data
US 2009/0002801 A1 Jan. 1, 2009

(30) Foreign Application Priority Data
Jun. 26, 2007 (JP) ............................... 2007-167914

(51) Int. Cl.
*G02F 1/153* (2006.01)
(52) U.S. Cl. ...................... 359/270; 359/265; 359/273
(58) Field of Classification Search ................. 359/270, 359/265, 273, 237, 267, 272, 245
See application file for complete search history.

(56) References Cited

U.S. PATENT DOCUMENTS 3,844,636 A 10/1974 Maricle et al.

5,138,481 A * 8/1992 Demiryont ................... 359/269
2006/0203323 A1 9/2006 Tonar et al.

FOREIGN PATENT DOCUMENTS

| EP | 0 851 271 A2 | 7/1998 |
| EP | 1 589 369 A2 | 10/2005 |
| EP | 1 591 827 A1 | 11/2005 |

OTHER PUBLICATIONS

European Search Report dated Sep. 15, 2008 from corresponding European Patent Application No. EO 08 01 1369.

* cited by examiner

*Primary Examiner*—Hung X Dang
(74) *Attorney, Agent, or Firm*—Roberts Mlotkowski Safran & Cole, P.C.; Thomas W. Cole

(57) ABSTRACT

An electrochromic mirror includes a transparent electrode film, an electrochromic film formed at one thickness direction side of the transparent electrode film, a light reflective film that reflects light that has transmitted through the transparent electrode film and the electrochromic film, a lithium ion transmissive film provided between the electrochromic film and the light reflective film, an electrically conductive film provided at the one thickness direction side of the transparent electrode film and at a side of the light reflective film opposite from the lithium ion transmissive film, and an electrolytic solution that comprises lithium ions and is enclosed between the light reflective film and the electrically conductive film. The lithium ion transmissive film transmits lithium ions and imposed diffusion of silver from the side of the light reflective film to the side of the electrochromic film.

7 Claims, 7 Drawing Sheets

ELECTROCHROMIC MIRROR

CROSS-REFERENCE TO RELATED APPLICATION

This application claims priority under 35 USC 119 from Japanese Patent Application No. 2007-167914, the disclosure of which is incorporated by reference herein.

BACKGROUND OF THE INVENTION

1. Field of the Invention

The present invention relates to an electrochromic mirror that is used, for example, in a rearview outer mirror or rearview inner mirror of a vehicle, and in which reflectance can be varied by applying a voltage.

2. Description of the Related Art

In an electrochromic mirror disclosed in the specification of U.S. Pat. No. 3,844,636, a palladium film is used as a light reflective film.

However, since palladium has relatively low reflectance, use of a silver film has been under investigation. However, when an electrochromic film is formed with tungsten trioxide, there is a possibility of yellow discoloration of the tungsten trioxide by diffusion of silver to the electrochromic film.

An electrochromic mirror is sought that can prevent or extremely effectively suppress diffusion of silver at an electrochromic film even when silver is used in a reflective film.

SUMMARY OF THE INVENTION

The present invention has been made in view of the above circumstances and provides an electrochromic mirror.

According to a first aspect of the invention, there is provided an electrochromic mirror, comprising: a transparent electrode film that is capable of transmission of light and has electrical conductivity; an electrochromic film that is formed at one thickness direction side of the transparent electrode film and is colored due to being subjected to a reduction reaction; a light reflective film that is formed from silver or an alloy containing silver and that reflects light that has transmitted through the transparent electrode film and the electrochromic film; a transparent lithium ion transmissive film that is provided between the electrochromic film and the light reflective film, and that transmits lithium ions and imposed diffusion of silver from the side of the light reflective film to the side of the electrochromic film; an electrically conductive film having electrical conductivity that is provided at the one thickness direction side of the transparent electrode film and at a side of the light reflective film that is opposite from the lithium ion transmissive film; and an electrolytic solution that comprises lithium ions and is enclosed between the light reflective film and the electrically conductive film, and in which, due to application of a voltage such that the electrically conductive film is made positive and the transparent electrode film is made negative, the lithium ions move toward the side of the electrochromic film and are provided to the reduction reaction of the electrochromic film.

BRIEF DESCRIPTION OF THE DRAWINGS

Preferred embodiments of the present invention will be described in detail based on the following figures, wherein.

DETAILED DESCRIPTION OF THE INVENTION

<Configuration of First Exemplary Embodiment>

Figure 1:
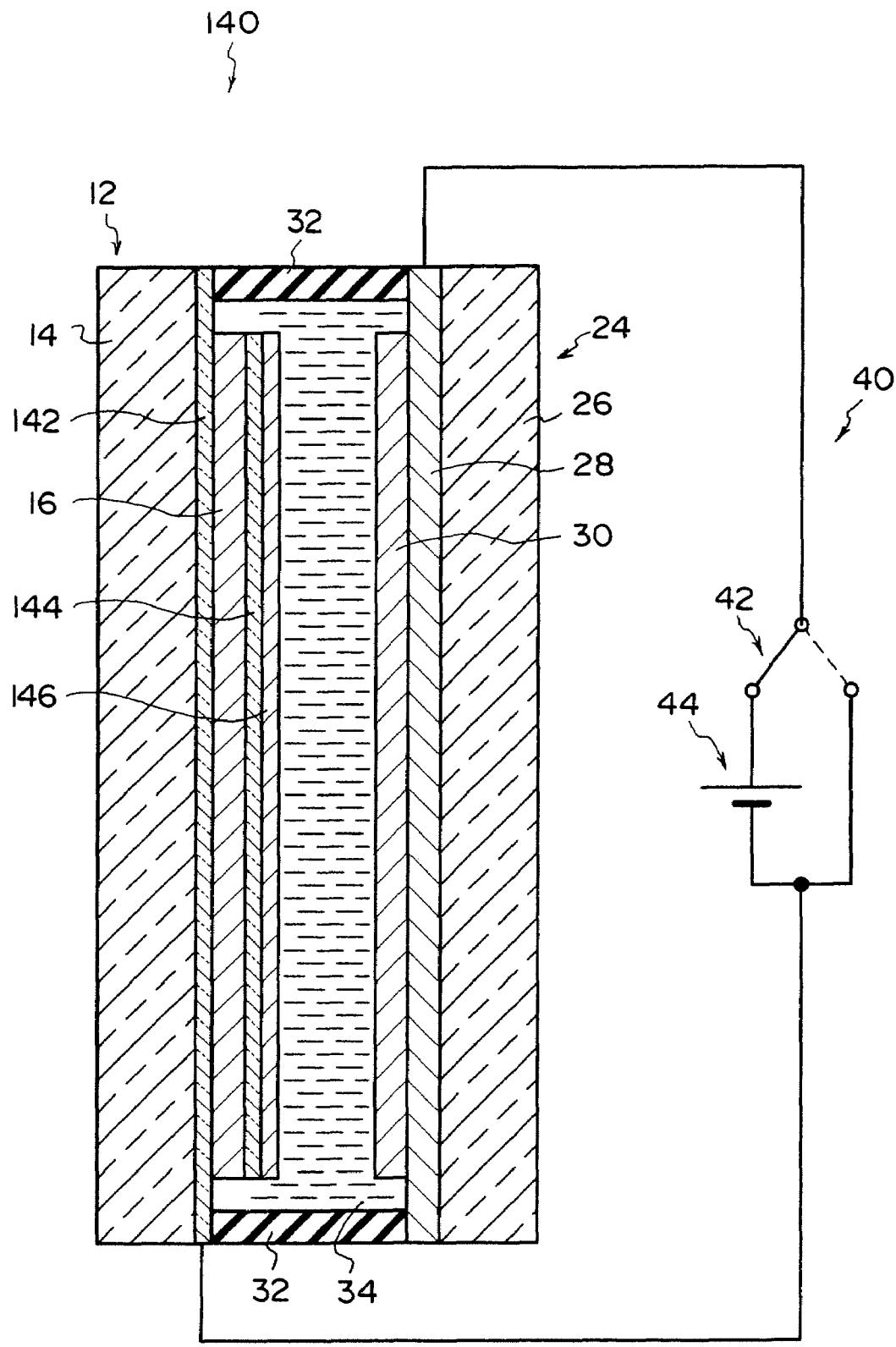
FIG. 1 is a cross-sectional view showing the outline of the configuration of an electrochromic mirror according to a first exemplary embodiment of the present invention.

In FIG. 1, the configuration of an electrochromic mirror 140 according to a first exemplary embodiment of the present invention is shown in a schematic cross-sectional view.

As shown in this drawing, the electrochromic mirror 140 is provided with a front surface-side substrate 12. The front surface-side substrate 12 is provided with a transparent substrate main body 14 formed from glass or the like. At a surface at one thickness direction side of the substrate main body 14, an electrochromic film 16 is formed. The electrochromic film 16 is formed, for example, from tungsten trioxide ($WO_3$), molybdenum trioxide ($MoO_3$), or a mixture containing such an oxide and, in the present exemplary embodiment, in particular, the electrochromic film 16 is formed from tungsten trioxide.

A thickness of the electrochromic film 16 along the thickness direction of the substrate main body 14 is set in a range of from 300 nm to 1000 nm and, in the present exemplary embodiment in particular, the thickness of the electrochromic film 16 is set at 500 nm. A transparent electrode film 142 is provided between the substrate main body 14 and the electrochromic film 16. The transparent electrode film 142 is formed from indium tin oxide ($In_2O_3$:Sn, or "ITO"), tin oxide ($SnO_2$), fluorine-doped tin oxide ($SnO_2$:F), zinc oxide ($ZnO_2$) or the like, or from a mixture of these. The transparent electrode film 142 is connected to a negative electrode of a direct-current power source 44.

A transparent lithium ion transmissive film 144 is formed at an opposite side surface of the electrochromic film 16 to the transparent electrode film 142. The lithium ion transmissive film 144 is formed from lithium fluoride or magnesium fluoride, and when the switch 42 is switched to an ON state, lithium ions ($Li^+$) in an electrolytic solution 34 are transmitted therethrough. Further, a light reflective film 146 constituted by silver or an alloy containing silver is formed at an opposite side surface of the lithium ion transmissive film 144 to the electrochromic film 16.

At one thickness direction side of the front surface-side substrate 12 of the above configuration, a back surface-side substrate 24 is provided so as to face the front surface-side substrate 12. The back surface-side substrate 24 is provided with a transparent substrate main body 26 formed from glass or the like. At a surface at the other thickness direction side, i.e., the front surface-side substrate 12 side, of the substrate main body 26, an electrically conductive film 28 is formed. The electrically conductive film 28 is formed from a metal such as chrome (Cr) or nickel (Ni), indium tin oxide ($IN_2O_3$:

Sn, or "ITO"), tin oxide ($SnO_2$), fluorine-doped tin oxide ($SnO_2$:F), zinc oxide ($ZnO_2$) or the like, or from a mixture of these.

At a surface at the front surface-side substrate 12 side of the electrically conductive film 28, a carbon film 30 having electrical conductivity is formed. The carbon film 30 comprises a synthetic resin material such as a phenol resin, a polyimide resin or an acrylic, as a binder. Further, in addition to these binders, the carbon film 30 is formed from a mixture of graphite, carbon black and activated carbon and, in particular, the activated carbon is contained in this mixture in an amount of 50 weight % or more.

A thickness dimension of the carbon film 30 along the thickness direction of the substrate main body 26 is set to be 50 μm or more and, in the carbon film 30 of the above configuration, a capacitance is set to be 10 mF/cm² or greater, or a charge storage capacity at a voltage of 1.5 V is set to be 15 mQ/cm² or greater. In the present exemplary embodiment, in particular, the capacitance is set to be 20 mF/cm², or the charge storage capacity at a voltage of 1.5 V is set to be 30 mQ/cm².

Between the front surface-side substrate 12 and the back surface-side substrate 24 of the above configuration, a predetermined clearance is formed, and sealing by a sealant 32 is carried out between an outer peripheral portion of the front surface-side substrate 12 and an outer peripheral portion of the back surface-side substrate 24. The electrolytic solution 34 is enclosed within the space surrounded by the front surface-side substrate 12, the back surface-side substrate 24 and the sealant 32. The electrolytic solution 34 comprises a solvent formed from propylene carbonate, ethylene carbonate, butylene carbonate, diethyl carbonate, γ-butyrolactone, dimethyl formamide or the like, or from a mixture of these and, in the present exemplary embodiment, in particular, propylene carbonate is used as the solvent.

In addition to such a solvent, the electrolytic solution 34 comprises lithium perchlorate ($LiClO_4$), lithium hexafluorophosphate ($LiPF_6$), lithium tetrafluoroborate ($LiBF_4$), lithium bis(trifluoromethane-sulfonyl)imide ($LiN(SO_2CF_3)_2$), lithium bis(pentafluoroethane-sulfonyl)imide ($LiN(SO_2C_2F_5)_2$), lithium trifluoromethanesulfonate ($LiCF_3SO_3$) or the like, or a mixture of these, as an electrolyte and, in the present exemplary embodiment, in particular, lithium perchlorate is used as the electrolyte.

Furthermore, the electrically conductive film 28 of the electrochromic mirror 140 of the above configuration is connected to the switch 42 which is a constituent part of a circuit 40. In the switch 42, a positive electrode of the direct-current power source 44, which is constituted by a battery or the like mounted at a vehicle and has a rated voltage of about 1.3 V, is connected to a terminal that is connected when the switch 42 is in an ON state. A negative electrode of the direct-current power source 44 is connected to the transparent electrode film 142. Further, a terminal which is connected when the switch 42 is in an OFF state is connected to the transparent electrode film 142 without being connected via the aforementioned direct-current power source 44 and, in the OFF state, the electrically conductive film 28 and the transparent electrode film 142 are short-circuited.

<Operation and Effects of First Exemplary Embodiment>

In the electrochromic mirror 140 of the above configuration, in the OFF state of the switch 42, the transparent electrode film 142, the electrochromic film 16 and the lithium ion transmissive film 144 become substantially transparent and, as a result, light that is incident from the opposite side of the substrate main body 14 to the electrochromic film 16 is transmitted through the substrate main body 14, the transparent electrode film 142, the electrochromic film 16 and the lithium ion transmissive film 144 and is reflected at the light reflective film 146. Furthermore, light that is reflected at the light reflective film 146 is transmitted through the lithium ion transmissive film 144, the electrochromic film 16, the transparent electrode film 142 and the substrate main body 14.

On the other hand, when the switch 42 is switched to the ON state, electrons ($e^-$) that have moved through the circuit 40 to the side of the transparent electrode film 142 enter into the electrochromic film 16, and lithium ions ($Li^+$) constituting the electrolyte of the electrolytic solution 34 are transmitted through the light reflective film 146 and the lithium ion transmissive film 144 and enter into the electrochromic film 16. As a result, in the electrochromic film 16, the reduction reaction of the following Formula 1 occurs, and $Li_xWO_3$ of a blue color referred to as tungsten bronze is formed at the electrochromic film 16.

$$Li^+ + e^- + WO_3 \rightarrow Li_xWO_3 \quad \text{(Formula 1)}$$

Due to the electrochromic film 16 being colored with a blue color in this manner, the reflectance is reduced as compared to before the electrochromic film 16 was colored.

Furthermore, when the aforementioned reduction reaction occurs, electrons ($e^-$) are moved from the carbon constituting the carbon film 30 to the side of the direct-current power source 44, whereby negative ions ($ClO_4^-$) of the lithium perchlorate constituting the electrolyte are moved to the side of the carbon film 30. As a result, a compensation reaction such as shown in the following Formula 2 occurs with respect to the aforementioned reduction reaction.

$$ClO_4^- + C - e^- \rightarrow C^+ \cdot ClO_4^- \quad \text{(Formula 2)}$$

Figure 2:
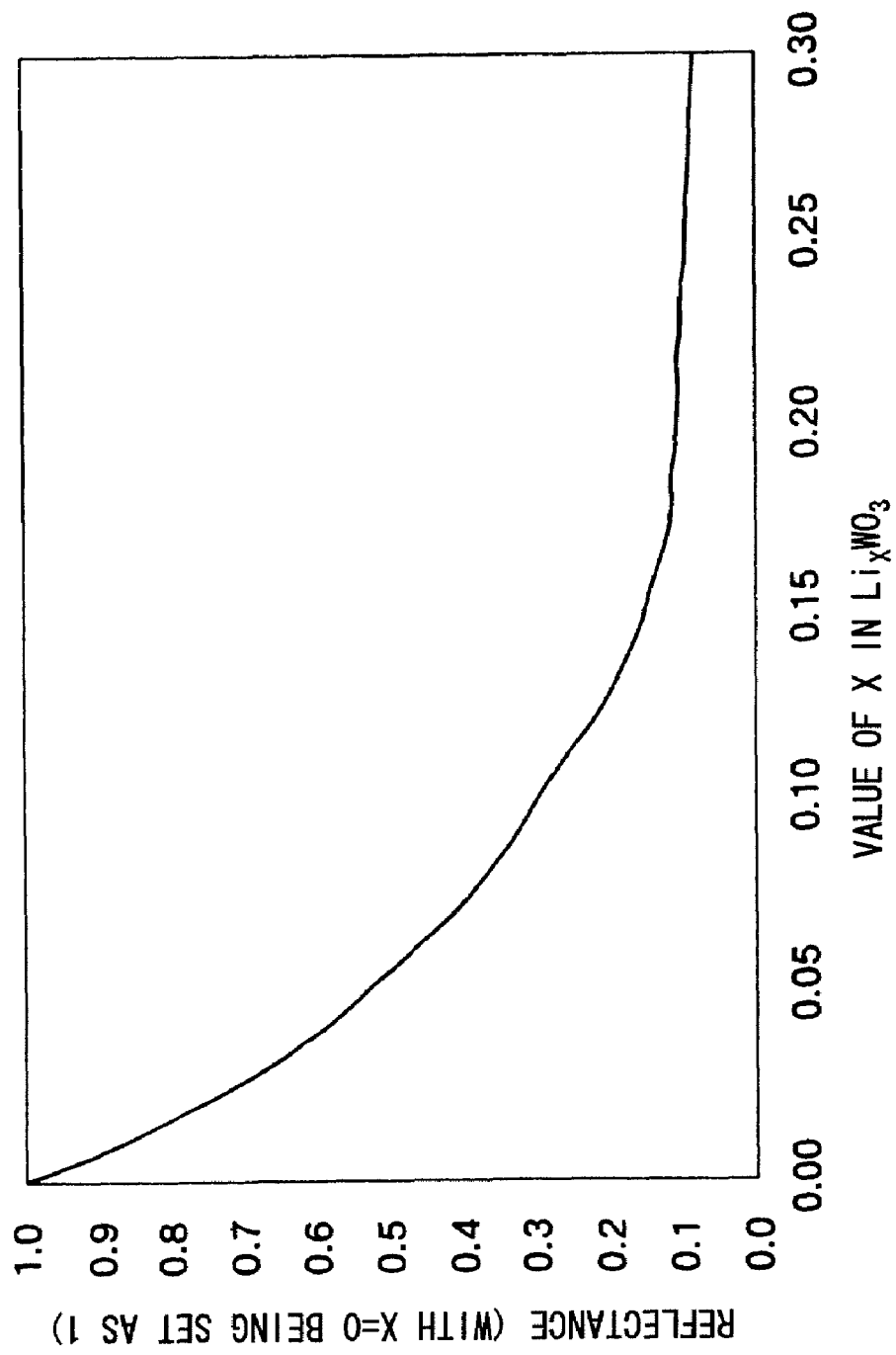
FIG. 2 is a graph showing the relationship between X in $Li_xWO_3$ and reflectance of light.

In FIG. 2, the relationship between X in $Li_xWO_3$ and the reflectance of light is shown in a graph. It should be noted that in this graph, a case where X=0, i.e., a case where the tungsten trioxide is transparent, is standardized as 1. As shown in this graph, at X=0.15 or greater, saturation generally occurs and, accordingly, at about X=0.15 to 0.2, sufficient coloring is achieved in the electrochromic film 16.

Figure 3:
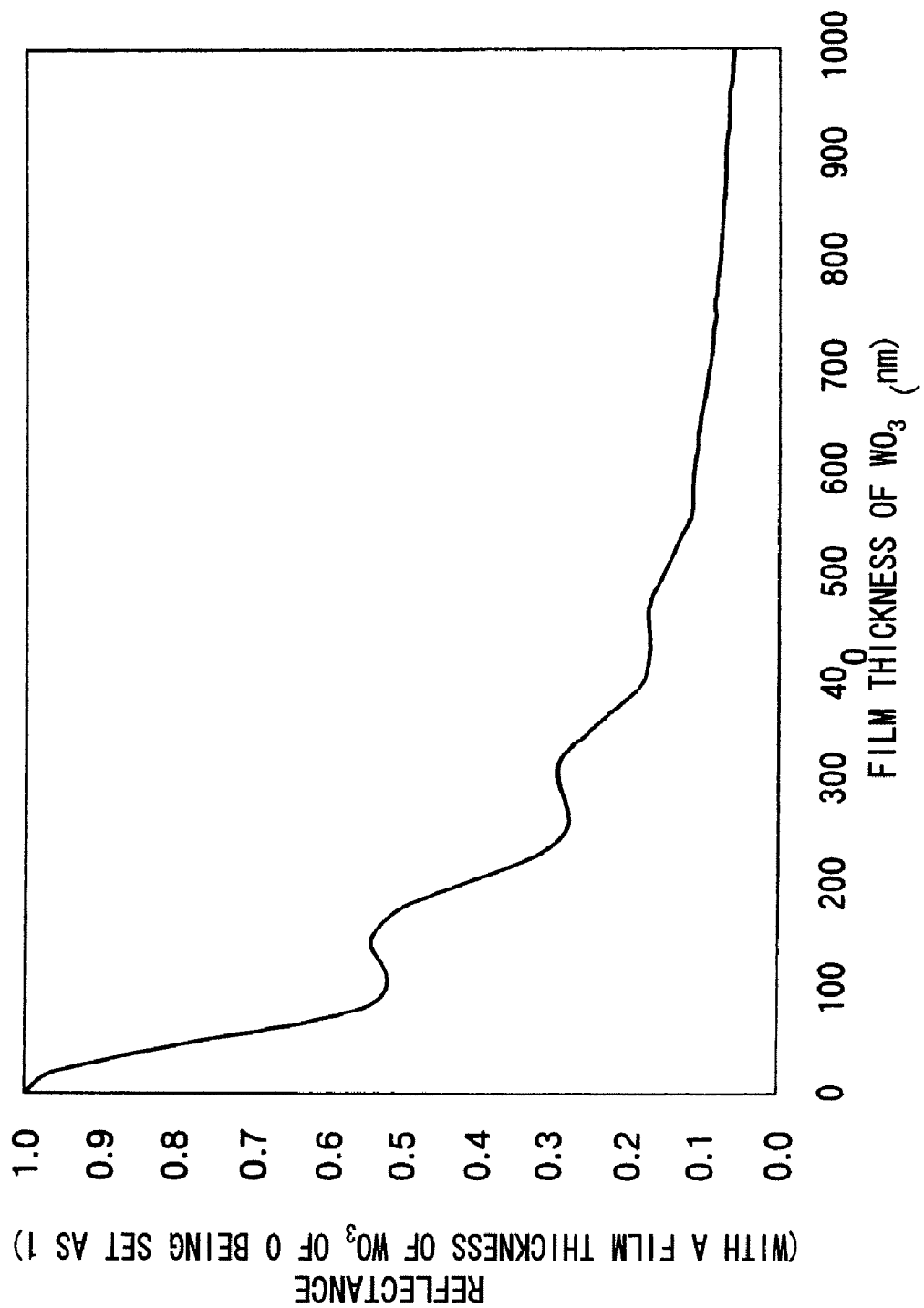
FIG. 3 is a graph showing the relationship between the thickness of an electrochromic film 16 and reflectance.

Further, in FIG. 3, the relationship between the film thickness of the electrochromic film 16 and the reflectance is shown in a graph. It should be noted that in this graph, the reflectance when there is no electrochromic film 16 is standardized as 1. As shown in this graph, since the reflectance sharply decreases up until the film thickness of the electrochromic film 16 becomes 300 nm and saturation occurs at 500 nm, the film thickness of the electrochromic film 16 is preferably set in the range of from 300 nm to 500 nm.

If the value of X in $Li_xWO_3$ is set at 0.15, a film thickness d of the electrochromic film 16 is set at 500 nm, a bulk density ρ of the tungsten trioxide constituting the electrochromic film 16 is set at 7.18 g/cm³, a degree of hole P of the tungsten trioxide constituting the electrochromic film 16 is set at 0.8, a Faraday constant F is set at 96485.3415 Q/mol, a molecular weight M of the tungsten trioxide is set at 231.9 mol, and these are substituted in the following Formula 3, a charge storage capacity Q becomes 17.92 mQ/cm² and, furthermore, if an applied voltage V is set at 1.3 and the result of equation 3 (i.e., Q=17.92 mQ/cm²) is substituted in the following Formula 4, a capacitance C becomes 13.79 mF/cm².

$$Q = (X \cdot d \cdot \rho \cdot P \cdot F)/M \quad \text{(Formula 3)}$$

$$C = Q/V \quad \text{(Formula 4)}$$

In other words, in the reduction reaction in order for coloring to be sufficiently carried out in the electrochromic film 16, the charge storage capacity obtained by the above Formula 3 and the capacitance obtained by the above Formula 4 become necessary. In the present exemplary embodiment, the carbon film 30 comprises activated carbon. The activated carbon is porous, and thus, the surface area is large. For this reason, it has a capacity for storing many negative ions and positive charges and, as a result, the capacitance of the carbon film 30 can be set at 20 mF/cm$^2$, or the charge storage capacity at a voltage of 1.5 V can be set to 30 mQ/cm$^2$.

In this manner, in the present exemplary embodiment, the capacitance and the charge storage capacity are both sufficiently larger than the results calculated in the above Formula 3 and Formula 4. Therefore, a sufficient reduction reaction can be caused to occur in the electrochromic film 16 and, as a result, by switching the switch 42 to the ON state and applying a voltage, the electrochromic film 16 can be sufficiently colored, as discussed above.

Further, the carbon film 30 contains not only the activated carbon, but also graphite and carbon ink and, as a result, the carbon film 30 is provided with sufficient electrical conductivity, and the reaction in the carbon film 30 can be accelerated.

Furthermore, in the present exemplary embodiment, at the time of coloring the electrochromic film 16, the voltage that is applied can be lowered to 1.3 V. As a result, when the switch 42 is switched to the OFF state and the transparent electrode film 142 and the electrically conductive film 28 are short-circuited, a reaction occurs in the opposite direction from the above Formula 1 and Formula 2, and the electrochromic film 16 is quickly decolored.

In the present exemplary embodiment, the light reflective film 146 is formed from silver or an alloy containing silver. If the light reflective film 146 formed from silver or an alloy containing silver is formed directly on the electrochromic film 16 formed from tungsten trioxide, there is a possibility that the silver of the light reflective film 146 will be diffused to the tungsten trioxide of the electrochromic film 16, and that the tungsten trioxide will be yellowed.

However, in the present exemplary embodiment, since the lithium ion transmissive film 144 is provided between the electrochromic film 16 and the light reflective film 146, diffusion of silver to the electrochromic film 16 is prevented or effectively suppressed. As a result, even if the light reflective film 146 is formed from silver or an alloy containing silver, yellowing of the electrochromic film 16 can be prevented or effectively suppressed, and quality can be excellently maintained over a long period.

When the electrochromic mirror 140 such as described above is used, for example, in a mirror main body of a rearview inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear has its headlights turned on, by switching the switch 42 to the ON state to color the electrochromic film 16 and reduce the reflectance, reflected light of the headlights can be reduced, and glare is lowered.

<Configuration of Second Exemplary Embodiment>

Next, other exemplary embodiments of the present invention are explained. It should be noted that in the explanations of each exemplary embodiment in the following, portions that are basically the same as those in exemplary embodiments, including the first exemplary embodiment, previous to the exemplary embodiment being explained are given the same reference numerals and detailed explanation thereof is omitted.

Figure 4:
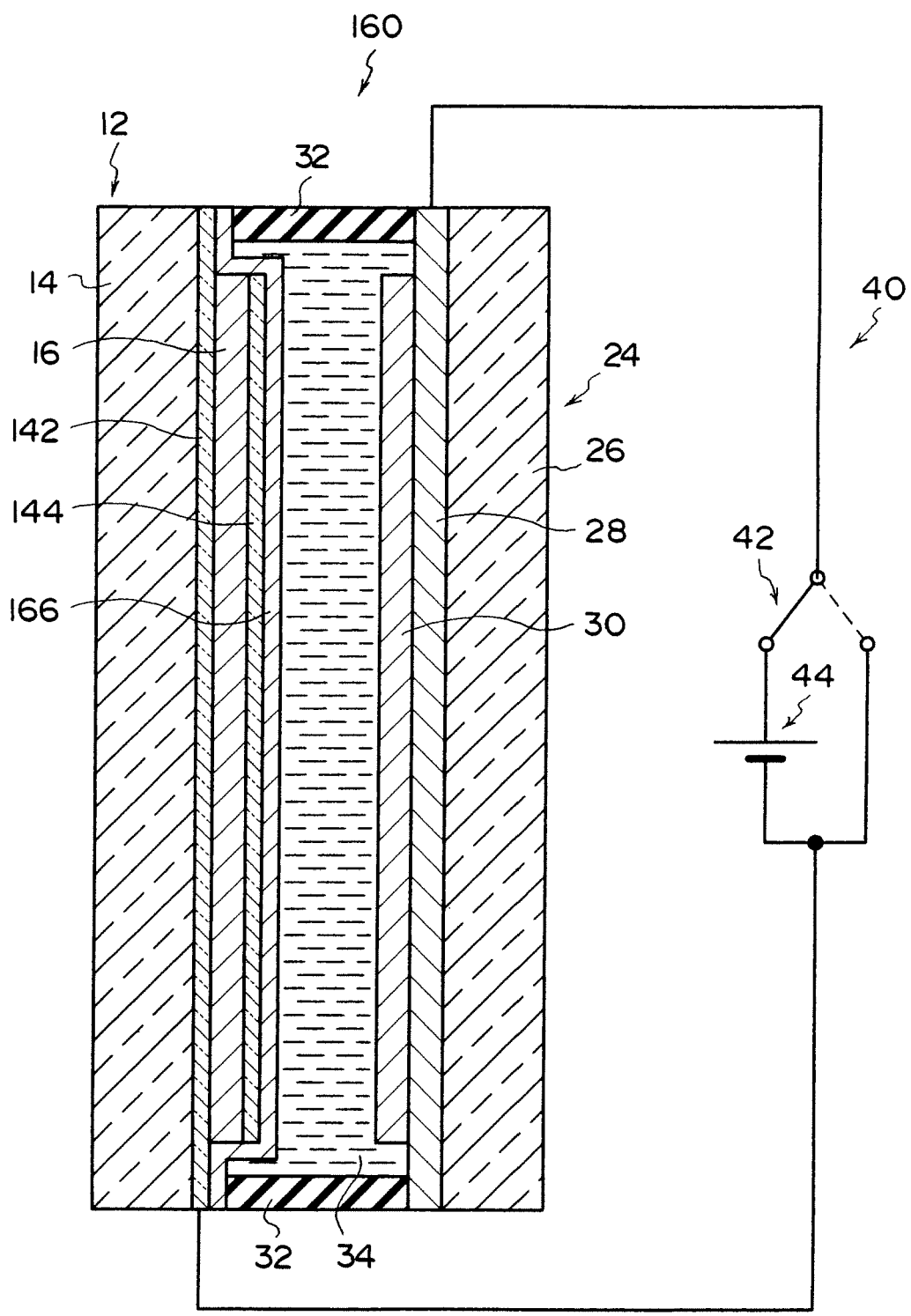
FIG. 4 is a cross-sectional view showing the outline of the configuration of an electrochromic mirror according to a second exemplary embodiment of the present invention.

In FIG. 4, the configuration of an electrochromic mirror 160 according to the present exemplary embodiment is shown in schematic cross-sectional view.

As shown in this drawing, the configuration of the electrochromic mirror 160 is basically the same as that of the electrochromic mirror 140 according to the first exemplary embodiment, but the electrochromic mirror 160 is not provided with the light reflective film 146 and, instead, is provided with a light reflective film 166. Although the light reflective film 166 is the same as the light reflective film 146 in that it is constituted from silver or an alloy containing silver, the outer peripheral edge thereof is contacted with the outer peripheral edge of the transparent electrode film 142 and is electrically conductive therewith.

<Operation and Effects of Second Exemplary Embodiment>

In the electrochromic mirror 160 of the above configuration, since the outer peripheral edge of the light reflective film 166 formed from silver or an alloy containing silver is contacted with the outer peripheral edge of the transparent electrode film 142 and is electrically connected thereto, when the switch 42 is switched to the ON state, the light reflective film 166 can be made to function as an electrode.

It should be noted that since the configuration of the present exemplary embodiment is basically the same as that of the first exemplary embodiment except for the fact that the light reflective film 166 is provided in place of the light reflective film 146, the present exemplary embodiment achieves the same operation as that of the first exemplary embodiment and can obtain the same effects.

<Configuration of Third Exemplary Embodiment>

Next a third exemplary embodiment of the present invention will be explained.

Figure 5:
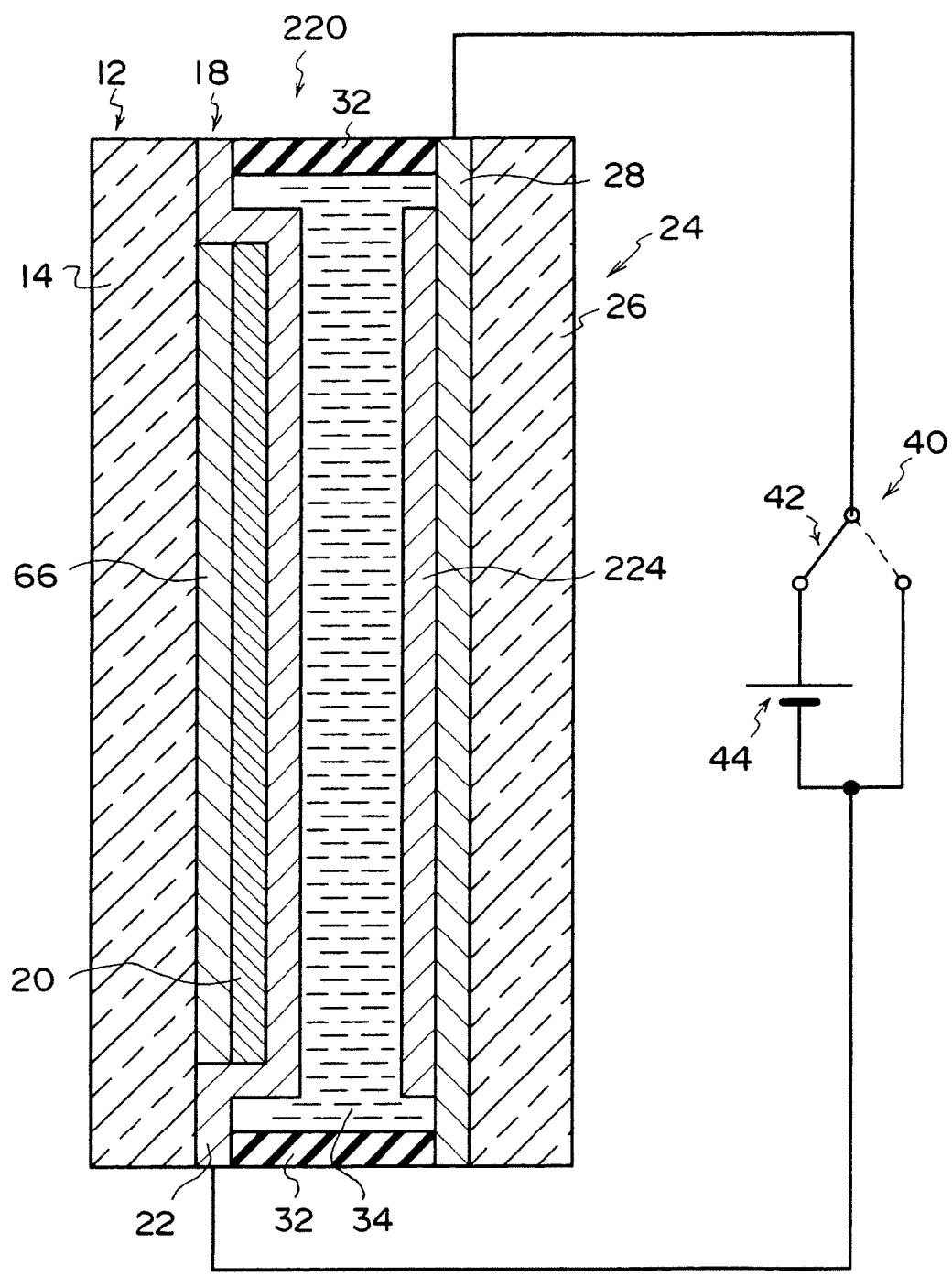
FIG. 5 is a cross-sectional view showing the outline of the configuration of an electrochromic mirror according to a third exemplary embodiment of the present invention.

In FIG. 5, the configuration of an electrochromic mirror 210 according to the present exemplary embodiment is shown in schematic cross-sectional view.

As shown in this drawing, the electrochromic mirror 210 is not provided with the carbon film 30 and, instead, is provided with a negative ion reaction film 212 as a reduction reaction compensation unit. The negative ion reaction film 212 is formed from an electrically conductive polymer such as polypyrrole, polyaniline, polyacetylene, polythiophene, polyparapyrene, polyfuran or the like, or a redox polymer such as polyvinylferrocene. For example, when polypyrrole is used as the negative ion reaction film 212, formation is carried out by dissolving pyrrole in a solvent and coating this on the substrate main body 26. Further, when polyvinylferrocene is used as the negative ion reaction film 212, formation is carried out by dissolving vinylferrocene in a solvent and coating this on the substrate main body 26. The mass of the negative ion reaction film 212 is set so as to be 0.012 mg/cm$^2$ or more.

<Operation and Effects of Third Exemplary Embodiment>

In the present electrochromic mirror 210, when the above-described reduction reaction of Formula 1 occurs at the electrochromic mirror 16 due to the switch 42 being switched to the ON state, the electrically conductive polymer or redox polymer constituting the negative ion reaction film 212 is oxidized to take on a positive charge. As a result, negative ions ($ClO_4^-$) of the lithium perchlorate constituting the electrolyte enter into the negative ion reaction film 212 to establish a charge balance. In this manner, if the negative ion reaction film 212 is formed from polypyrrole, a compensation reaction such as that of the following Formula 5a occurs, and if the negative ion reaction film 212 is formed from polyvinylferrocene, a compensation reaction such as that of the following Formula 5b occurs, with respect to the aforementioned reduction reaction.

$$ClO_4^- + PPy - e^- \rightarrow PPy^+ \cdot ClO_4^- \quad \text{(Formula 5a)}$$

$$ClO_4^- + PVF - e^- \rightarrow PVF^+ \cdot ClO_4^- \quad \text{(Formula 5b)}$$

It should be noted that PPy indicates polypyrrole in Formula 5a, and that PVF indicates polyvinylferrocene in Formula 5b.

If the value of X in $Li_xWO_3$ is set at 0.15, the film thickness d of the electrochromic film 16 is set at 500 nm, the bulk density ρ of the tungsten trioxide constituting the electrochromic film 16 is set at 7.18 g/cm³, the degree of hole P of the tungsten trioxide constituting the electrochromic film 16 is set at 0.8, the molecular weight $M_W$ of the tungsten trioxide is set at 231.9 mol, and these are substituted in the following Formula 6, a reaction amount (number of moles) n of the tungsten trioxide becomes 1.86 mM/cm².

$$n = (X \cdot d \cdot \rho \cdot P)/M_W \quad \text{(Formula 6)}$$

Furthermore, the same number of moles of the electrically conductive polymer or redox polymer constituting the negative ion reaction film 212 as that of the aforementioned n must also be reacted. Accordingly, when the molecular weight $M_P$ per monomer of the electrically conductive polymer or redox polymer used in the negative ion reaction film 212 is set at 65.07 g/mol and substituted in the following Formula 7, a mass m of 0.012 mg/cm² of the electrically conductive polymer or redox polymer becomes necessary.

$$m = n \cdot M_P \quad \text{(Formula 7)}$$

In the present exemplary embodiment, m is set at 0.012 mg/cm² or greater for the negative ion reaction film 212. Therefore, a sufficient reduction reaction can be caused to occur in the electrochromic film 16 and, as a result, by switching the switch 42 to the ON state and applying a voltage, the electrochromic film 16 can be sufficiently colored, as discussed above.

Furthermore, in the present exemplary embodiment, at the time of coloring the electrochromic film 16, the voltage that is applied can be lowered to 1.3 V. As a result, when the switch 42 is switched to the OFF state and the transparent electrode film 142 and the electrically conductive film 28 are short-circuited, a reaction in the opposite direction from the above Formulae 1, 5a or 5b occurs, and the electrochromic film 16 is quickly decolored.

When the electrochromic mirror 210 such as described above is used, for example, in a mirror main body of a rearview inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear has its headlights turned on, by switching the switch 42 to the ON state to color the electrochromic film 16 and reduce the reflectance, reflected light of the headlights can be reduced, and glare is lowered.

<Configuration of Fourth Exemplary Embodiment>

Figure 6:
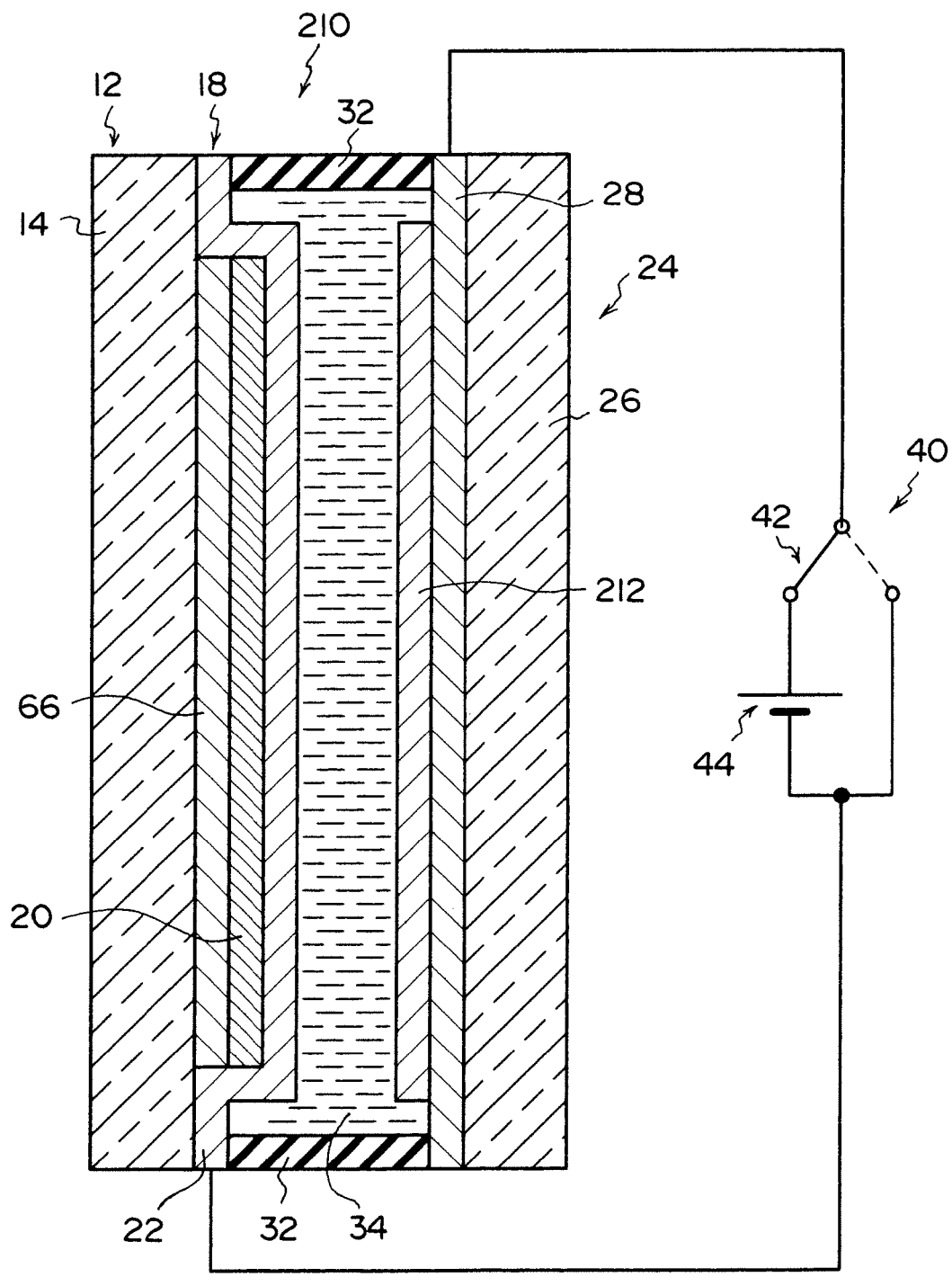
FIG. 6 is a cross-sectional view showing the outline of the configuration of an electrochromic mirror according to a fourth exemplary embodiment of the present invention.

In FIG. 6, the configuration of an electrochromic mirror 220 according to a fourth exemplary embodiment of the present invention is shown in schematic cross-sectional view.

As shown in this drawing, in the electrochromic mirror 220, the electrically conductive film 28 is formed from silver (Ag). The carbon film 30 is not formed at the surface at the front surface side substrate 12 side of the electrically conductive film 28 and, instead, a hardly-soluble salt film 224 constituting the reduction reaction compensation unit is formed as a precipitation film. The hardly-soluble salt film 224 is formed from silver chloride, bromine chloride, thiocyanate chloride or the like and, in the present exemplary embodiment, in particular, the hardly-soluble salt film 224 is formed from silver chloride.

<Operation and Effects of Fourth Exemplary Embodiment>

In the present electrochromic mirror 220, when the reduction reaction of the above-described Formula 1 occurs in the electrochromic film 16 due to the switch 42 being switched to the ON state, as shown in the following Formula 8, negative ions (Cl⁻) of the lithium perchlorate constituting the electrolyte react with silver (Ag) constituting the electrically conductive film 28 and, as a result, silver chloride (AgCl) is generated and precipitates on the hardly-soluble salt film 224 formed from silver chloride. As a result, compensation corresponding to the aforementioned reduction reaction is carried out.

$$Cl^- + Ag - e^- \rightarrow AgCl \quad \text{(Formula 8)}$$

In this manner, in the present exemplary embodiment, since the compensation reaction reliably occurs with respect to the reduction reaction in the electrochromic film 16, at the time of coloring the electrochromic film 16, the voltage that is applied can be lowered to 1.3 V. As a result, the switch 42 is switched to the OFF state and the transparent electrode film 142 and the electrically conductive film 28 are short-circuited, a reaction in the opposite direction from the above Formula 1 and Formula 8 occurs, and the electrochromic film 16 is quickly decolored.

When the electrochromic mirror 220 such as described above is used, for example, in a mirror main body of a rearview inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear has its headlights turned on, by switching the switch 42 to the ON state to color the electrochromic film 16 and reduce the reflectance, reflected light of the headlights can be reduced, and glare is lowered.

<Configuration of Fifth Exemplary Embodiment>

Figure 7:
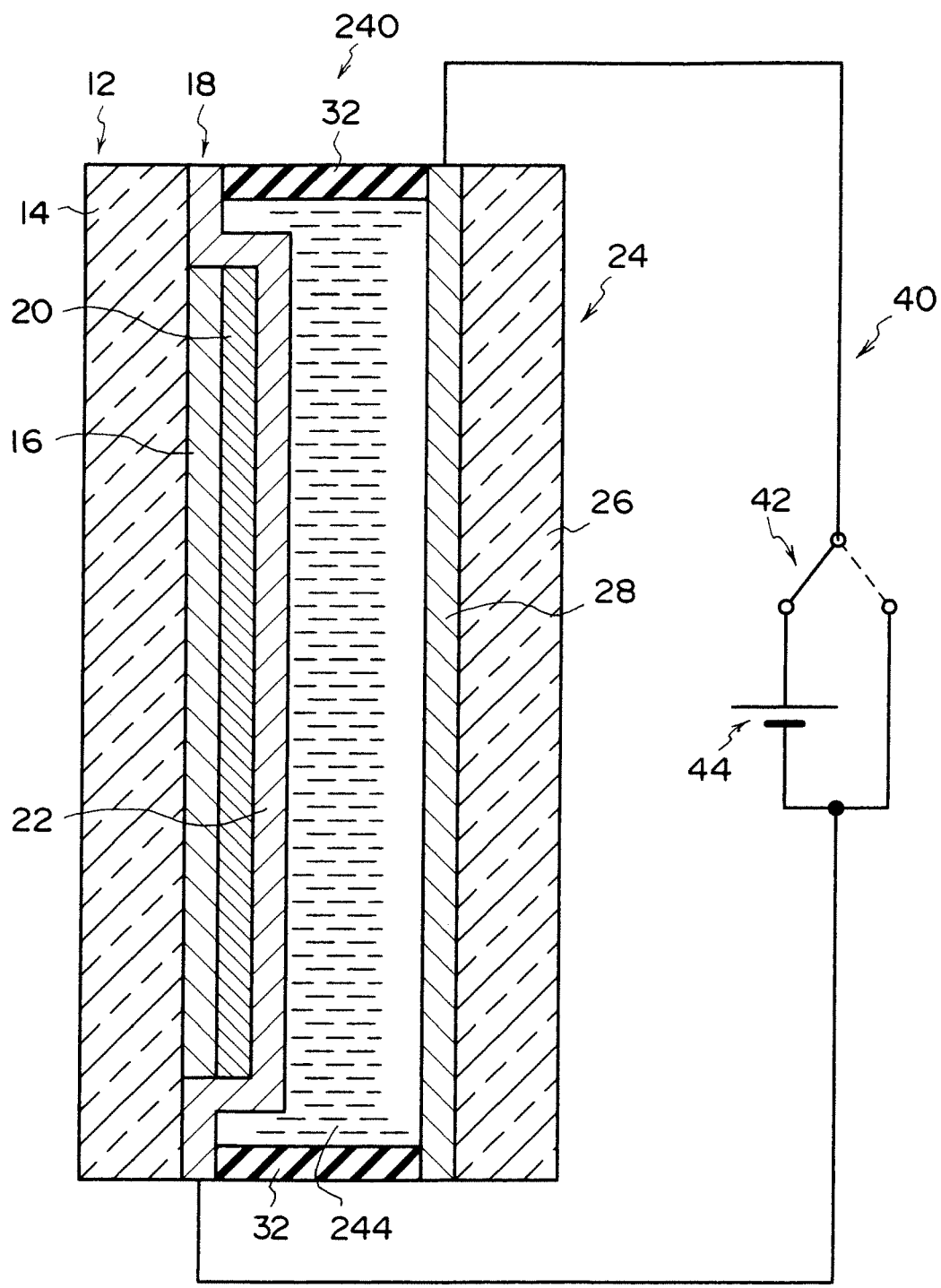
FIG. 7 is a cross-sectional view showing the outline of the configuration of an electrochromic mirror according to a fifth exemplary embodiment of the present invention.

In FIG. 7, the configuration of an electrochromic mirror 240 according to a fifth exemplary embodiment of the present invention is shown in schematic cross-sectional view.

As shown in this drawing, in the electrochromic mirror 240, the carbon film 30 is not formed at the surface at the front surface-side substrate 12 side of the electrically conductive film 28. Further, an electrolytic solution 244 is enclosed between the front surface-side substrate 12 and the back surface-side substrate 24 instead of the electrolytic solution 34.

In addition to the materials constituting the electrolytic solution 34, the electrolytic solution 244 contains ferrocene $(Fe(C_5H_5)_2)$, which is a neutral material serving as an oxidant constituting the reduction reaction compensation unit.

<Operation and Effects of Fifth Exemplary Embodiment>

In the present electrochromic mirror 240, when the above-described reduction reaction of Formula 1 occurs in the electrochromic film 16 due to the switch 42 being switched to the ON state, the ferrocene contained in the electrolytic solution 244 takes on a positive charge as shown in the following Formula 9. As a result, compensation corresponding to the aforementioned reduction reaction is carried out.

$$Fe(C_5H_5)_2 \rightarrow [Fe(C_5H_5)_2]^+ \quad \text{(Formula 9)}$$

In this manner, in the present exemplary embodiment, since the compensation reaction reliably occurs with respect to the reduction reaction in the electrochromic film 16, at the time of coloring the electrochromic film 16, the voltage that is applied can be lowered to 1.3 V. As a result, when the switch 42 is switched to the OFF state and the transparent electrode film 142 and the electrically conductive film 28 are short-circuited, a reaction in the opposite direction from the above Formula 1 and Formula 9 occurs, and the electrochromic film 16 is quickly decolored.

When the electrochromic mirror 240 such as described above is used, for example, in a mirror main body of a rear-view inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear has its headlights turned on, by switching the switch 42 to the ON state to color the electrochromic film 16 and reduce the reflectance, reflected light of the headlights can be reduced, and glare is lowered.

It should be noted that, although the third exemplary embodiment through the fifth exemplary embodiment described above were modified examples of the first exemplary embodiment, the third exemplary embodiment through the fifth exemplary embodiment may be configured to be modified examples of the second exemplary embodiment.

Embodiments of the present invention are described above, but the present invention is not limited to these embodiments as will be clear to those skilled in the art.

According to a first aspect of the present invention, an electrochromic mirror comprises: a transparent electrode film that is capable of transmission of light and has electrical conductivity; an electrochromic film that is formed at one thickness direction side of the transparent electrode film and is colored due to being subjected to a reduction reaction; a light reflective film that is formed from silver or an alloy containing silver and that reflects light that has transmitted through the transparent electrode film and the electrochromic film; a transparent lithium ion transmissive film that is provided between the electrochromic film and the light reflective film, and that transmits lithium ions and imposed diffusion of silver from the side of the light reflective film to the side of the electrochromic film; an electrically conductive film having electrical conductivity that is provided at the one thickness direction side of the transparent electrode film and at a side of the light reflective film that is opposite from the lithium ion transmissive film; and an electrolytic solution that comprises lithium ions and is enclosed between the light reflective film and the electrically conductive film, and in which, due to application of a voltage such that the electrically conductive film is made positive and the transparent electrode film is made negative, the lithium ions move toward the side of the electrochromic film and are provided to the reduction reaction of the electrochromic film.

In the electrochromic mirror according to the above first aspect, light that has been transmitted through the transparent electrode film, the electrochromic film and the lithium ion transmissive film is reflected by the light reflective film.

Further, when the voltage is applied such that the electrically conductive film is made positive and the transparent electrode film is made negative, lithium ions of the electrolytic solution enclosed between the electrically conductive film and the light reflective film move toward the side of the electrochromic film. Due to the lithium ions moving toward the side of the electrochromic film, the electrochromic film undergoes a reduction reaction, and the electrochromic film is colored due to this reduction reaction. Due to the electrochromic film being colored in this manner, transmission of light in the electrochromic film is lowered.

Further, in the electrochromic mirror according to the above first aspect, although the light reflective film is formed from silver or an alloy containing silver, diffusion of silver to the electrochromic film is imposed by the lithium ion transmissive film provided between the light reflective film and the electrochromic film. As a result, generation of problems caused by silver being diffused to the electrochromic film can be prevented or effectively suppressed.

In the above first aspect, the light reflective film may be electrically connected to the transparent electrode film.

According to the above configuration, the light reflective film is electrically connected to the transparent electrode film. As a result, when the voltage is applied, the light reflective film constituted from silver or an alloy containing silver also functions as an electrode.

In the above first aspect, the electrochromic mirror may further comprise a reduction reaction compensation unit that compensates the reduction reaction by storing electrical charge when the voltage is being applied or by carrying out an oxidation reaction with negative ions in the electrolytic solution.

According to the above configuration, when voltage is applied such that the electrically conductive film is made positive and the transparent electrode film is made negative, electrical charge is stored or an oxidation reaction with negative ions in the electrolytic solution is carried out in the reduction reaction compensation unit and the reduction reaction at the electrochromic mirror is compensated.

In the above configuration, the reduction reaction compensation unit may comprise a carbon film having electrical conductivity that is formed at a light reflective film side of the electrically conductive film and contains activated carbon.

According to the above configuration, when the voltage is applied such that the electrically conductive film is made positive and the transparent electrode film is made negative, negative ions of the electrolytic solution move toward the side of the carbon film provided at a light reflective film side of the electrically conductive film, and the negative ions are stored in the carbon film. The carbon film is formed containing activated carbon. Since the activated carbon is porous and therefore has a large surface area, it can store many negative ions.

As a result, even if the aforementioned voltage that is applied to the electrically conductive film and the light reflective film is low, the reduction reaction can be caused to sufficiently occur in the electrochromic film. Moreover, since the reduction reaction can be caused to occur in the electrochromic film even with a low voltage in this manner, the electrochromic film can be easily decolored after the termination of the voltage application.

Further, in the above configuration, the reduction reaction compensation unit may comprise a negative ion reaction film that is formed from an electrically conductive polymer or redox polymer and is provided at a light reflective film side of the electrically conductive film, and that is oxidized by negative ions that have moved toward the side of the electrically conductive film due to the voltage being applied.

According to the above configuration, when the voltage is applied such that the electrically conductive film is made positive and the transparent electrode film is made negative, negative ions of the electrolytic solution move toward the side of the negative ion reaction film formed from the electrically conductive polymer or redox polymer, and the negative ion reaction film is oxidized by the negative ions.

In this manner, due to the negative ion reaction film being formed from the electrically conductive polymer or redox polymer, many negative ions are provided to the oxidation of the negative ion reaction film and, therefore, even if the aforementioned voltage that is applied to the electrically conductive film and the light reflective film is low, the reduction reaction can be caused to sufficiently occur in the electrochromic film. Moreover, since the reduction reaction can be caused to occur in the electrochromic film even with a low voltage in this manner, the electrochromic film can be easily decolored after the termination of the voltage application.

Further, in the above configuration, the electrically conductive film may be formed from silver or an alloy containing silver; the electrolytic solution may be formed to comprise negative ions of a hardly-soluble salt that react with ions of silver forming the electrically conductive film when a voltage is applied such that the electrically conductive film is made positive and the transparent electrode film is made negative; the electrochromic mirror may further comprise a precipitation film that is formed from the hardly-soluble salt and is provided at the light reflective film side of the electrically conductive film, and that causes a precipitate, which is formed by a reaction between negative ions of the hardly-soluble salt that have moved toward the side of the electrically conductive film due to the voltage being applied and ions of silver constituting the electrically conductive film, to precipitate; and the reduction reaction compensation unit may comprise the silver forming the electrically conductive film, the negative ions constituting the electrolytic solution, and the precipitation film.

According to the above configuration, when the voltage is applied such that the electrically conductive film is made positive and the transparent electrode film is made negative, negative ions of the hardly-soluble salt constituting the electrolytic solution move to the side of the electrically conductive film. These negative ions of the hardly-soluble salt react with ions of silver constituting the electrically conductive film and are precipitated on the precipitation film of the hardly-soluble salt provided at the opposite side to the light reflective film side of the electrically conductive film.

In this manner, since an oxidation reaction corresponding to the reduction reaction at the electrochromic film can be caused to sufficiently occur at the electrically conductive film and the precipitation film, even if the aforementioned voltage that is applied to the electrically conductive film and the light reflective film is low, the reduction reaction can be caused to sufficiently occur at the electrochromic film. Moreover, since the reduction reaction can be caused to occur in the electrochromic film even with a low voltage in this manner, the electrochromic film can be easily decolored after the termination of the voltage application.

Further, in the above configuration, the electrolytic solution may contain a reaction material that can be oxidized by neutral molecules or negative ions and that undergoes an oxidation reaction due to application of a voltage such that the electrically conductive film is made positive and the transparent electrode film is made negative and the reduction reaction compensation unit may comprise the reaction material.

In the above configuration, the electrolytic solution is constituted to contain, in addition to the lithium ions, a reaction material that can be oxidized by neutral molecules or negative ions, and when the voltage is applied such that the electrically conductive film is made positive and the transparent electrode film is made negative, an oxidization reaction occurs in the reaction material constituting the electrolytic solution. As a result, the aforementioned reduction reaction at the electrochromic film is compensated, and even if the aforementioned voltage that is applied to the electrically conductive film and to the light reflective film is low, the reduction reaction can be caused to sufficiently occur in the electrochromic film.

Moreover, since the reduction reaction can be caused to occur in the electrochromic film even with a low voltage in this manner, the electrochromic film can be easily decolored after the termination of the voltage application.

As explained above, in the electrochromic mirror according to the present invention, diffusion of silver at the electrochromic film can be prevented or effectively suppressed even when silver is used in a reflective film.

What is claimed is:

1. An electrochromic mirror, comprising:
   a transparent electrode film that is capable of transmission of light and has electrical conductivity;
   an electrochromic film that is formed at one thickness direction side of the transparent electrode film and is colored due to being subjected to a reduction reaction;
   a light reflective film that is formed from silver or an alloy containing silver and that reflects light that has transmitted through the transparent electrode film and the electrochromic film;
   a transparent lithium ion transmissive film that is provided between the electrochromic film and the light reflective film, and that transmits lithium ions and imposed diffusion of silver from the side of the light reflective film to the side of the electrochromic film;
   an electrically conductive film having electrical conductivity that is provided at the one thickness direction side of the transparent electrode film and at a side of the light reflective film that is opposite from the lithium ion transmissive film; and
   an electrolytic solution that comprises lithium ions and is enclosed between the light reflective film and the electrically conductive film, and in which, due to application of a voltage such that the electrically conductive film is made positive and the transparent electrode film is made negative, the lithium ions move toward the side of the electrochromic film and are provided to the reduction reaction of the electrochromic film.

2. The electrochromic mirror according to claim 1, wherein the light reflective film is electrically connected to the transparent electrode film.

3. The electrochromic mirror according to claim 1, further comprising a reduction reaction compensation unit that compensates the reduction reaction by storing electrical charge when the voltage is being applied or by carrying out an oxidation reaction with negative ions in the electrolytic solution.

4. The electrochromic mirror according to claim 3, wherein the reduction reaction compensation unit comprises a carbon film having electrical conductivity that is formed at a light reflective film side of the electrically conductive film and contains activated carbon.

5. The electrochromic mirror according to claim 3, wherein the reduction reaction compensation unit comprises a negative ion reaction film that is formed from an electrically conductive polymer or redox polymer and is provided at a light reflective film side of the electrically conductive film, and that is oxidized by negative ions that have moved toward the side of the electrically conductive film due to the voltage being applied.

6. The electrochromic mirror according to claim 3, wherein:
   the electrically conductive film is formed from silver or an alloy containing silver;
   the electrolytic solution is formed comprising negative ions of a hardly-soluble salt that react with ions of silver forming the electrically conductive film when a voltage is applied such that the electrically conductive film is made positive and the transparent electrode film is made negative;

the electrochromic mirror further comprises a precipitation film that is formed from the hardly-soluble salt and is provided at the light reflective film side of the electrically conductive film, and that causes a precipitate, which is formed by a reaction between negative ions of the hardly-soluble salt that have moved toward the side of the electrically conductive film due to the voltage being applied and ions of silver constituting the electrically conductive film, to precipitate; and the reduction reaction compensation unit comprises the silver forming the electrically conductive film, the negative ions constituting the electrolytic solution, and the precipitation film.

7. The electrochromic mirror according to claim 3, wherein:

the electrolytic solution contains a reaction material that can be oxidized by neutral molecules or negative ions and that undergoes an oxidation reaction due to application of a voltage such that the electrically conductive film is made positive and the transparent electrode film is made negative; and the reduction reaction compensation unit comprises the reaction material.

\* \* \* \* \*